US009728948B2

(12) United States Patent
Soulignac et al.

(10) Patent No.: US 9,728,948 B2
(45) Date of Patent: Aug. 8, 2017

(54) LIGHTNING PROTECTOR DEVICE

(71) Applicant: HERAKLES, Le Haillan (FR)

(72) Inventors: Thierry Soulignac, Bruges (FR);
Florine Bombled, Merignac (FR);
Francois M. Issac, Villenouvelle (FR);
Guillaume Sierra, Baziege (FR);
Philippe P. Desvergnes, St Aubin de Medoc (FR); Aurelien Cailler, Bordeaux (FR)

(73) Assignee: HERAKLES, Le Haillan (FR)

( * ) Notice: Subject to any disclaimer, the term of this patent is extended or adjusted under 35 U.S.C. 154(b) by 519 days.

(21) Appl. No.: 14/390,897

(22) PCT Filed: Apr. 3, 2013

(86) PCT No.: PCT/FR2013/050732
§ 371 (c)(1),
(2) Date: Oct. 6, 2014

(87) PCT Pub. No.: WO2013/150241
PCT Pub. Date: Oct. 10, 2013

(65) Prior Publication Data
US 2015/0171612 A1 Jun. 18, 2015

(30) Foreign Application Priority Data

Apr. 6, 2012 (FR) ..................... 12 01041

(51) Int. Cl.
*B64D 45/02* (2006.01)
*H02B 13/00* (2006.01)
(Continued)

(52) U.S. Cl.
CPC ............. *H02G 13/80* (2013.01); *B64D 45/02* (2013.01); *B64G 1/58* (2013.01); *F42B 3/18* (2013.01); *F42C 19/04* (2013.01)

(58) Field of Classification Search
CPC .......... B64D 45/02; H02G 13/80; B64G 1/52; B64G 1/58
See application file for complete search history.

(56) References Cited

U.S. PATENT DOCUMENTS 5,841,066 A * 11/1998 Bocherens ............. B64D 45/02
174/2
9,614,360 B2 * 4/2017 Soulignac ............. H02G 13/80
(Continued)

FOREIGN PATENT DOCUMENTS

| EP | 0790182 A1 | 8/1997 |
| FR | 2875215 A1 | 3/2006 |
| GB | 2295594 A | 6/1996 |

OTHER PUBLICATIONS

International Search Report for corresponding International PCT Application No. PCT/FR2013/050732, May 28, 2013.

*Primary Examiner* — Stephen W Jackson
*Assistant Examiner* — Christopher Clark
(74) *Attorney, Agent, or Firm* — Workman Nydegger

(57) ABSTRACT

A lightning protector device for laying on a structure that is to be protected the device comprises: a surface coating including at least one conductive paint layer. A plurality of electrically conductive elements is arranged in spaced-apart manner on the structure, and the elements are in contact with the conductive paint layer. A protective coating is arranged on the surface coating and comprises a material that is thermally insulating and electrically conductive. The protective coating covers the electrically conductive elements in part.

14 Claims, 4 Drawing Sheets

(51) Int. Cl.
*B64G 1/58* (2006.01)
*H02G 13/00* (2006.01)
*F42B 3/18* (2006.01)
*F42C 19/04* (2006.01)

(56) References Cited

U.S. PATENT DOCUMENTS

| | | | |
|---|---|---|---|
| 2006/0146473 A1* | 7/2006 | Heidlebaugh | H02G 13/00 361/220 |
| 2010/0263898 A1* | 10/2010 | Hebert | B64C 1/12 174/2 |
| 2010/0264665 A1* | 10/2010 | Hebert | B64C 1/12 290/55 |
| 2011/0073710 A1* | 3/2011 | Rawlings | B64C 21/10 244/130 |

* cited by examiner

LIGHTNING PROTECTOR DEVICE

BACKGROUND OF THE INVENTION

The present invention relates to the field of providing protection against lightning for use in high temperature environments. A particular but non-exclusive field for the present invention is that of providing protection against lightning for hot parts present in the thrusters of launchers for space, or tactical, etc. purposes, or in aeroengines.

The thrusters to be found in such launchers or the afterbody parts of aeroengines can be struck by lightning while they are in flight. When the part(s) struck by lightning is/are made of a non-conductive material, such as a composite material, or when they are covered in a dielectric material, their structure can be severely damaged by the pulse and the continuous components of the electric arc created by the lightning.

Various techniques already exist for providing protection against lightning, and they set out mainly to facilitate the flow of the electricity of the lightning through the protection rather than through the structure that is to be protected, thereby quickly increasing the size of the root or "termination" of the lightning arc so as to reduce its thermal and mechanical stresses.

Among presently-existing solutions, there are to be found coatings for providing protection against lightning that are constituted by:

metal fabrics fastened to the surface of the part that is to be protected;

metal grids that are deployed from a metal sheet having slots and that is stretched in order to form a grid, the grid likewise being fastened to the surface of the part that is to be protected;

conductive layers made by depositing particles of metal, e.g. particles of nickel, on the surface of the part that is to be protected in order to increase its conductivity; and metal fibers woven directly in the fiber texture of the reinforcement of the composite material part that is to be protected in order to form a multitude of small points at the surface of the part that are suitable for dispersing the root of the lightning arc.

Nevertheless, those various coatings present certain drawbacks, of which the main drawback is that they withstand high temperatures poorly. In addition, some of those coatings are difficult to put into place on structures that are complex in shape.

OBJECT AND SUMMARY OF THE INVENTION

Consequently, an object of the present invention is to propose a solution for providing protection against lightning for structures that are not conductive or that are covered in a dielectric, and to do in a manner that is reliable in a high temperature environment.

For this purpose, the invention proposes a lightning protector device for laying on a structure that is to be protected, said device comprising at least:

a surface coating comprising at least one conductive paint layer;

a plurality of electrically conductive elements arranged in spaced-apart manner on the structure that is to be protected, either directly thereon, or on the conductive layer of the surface coating, said elements being in contact with the conductive paint layer; and a protective coating arranged on the surface coating and comprising a material that is thermally insulating and electrically conductive, the protective coating covering the electrically conductive elements in part.

This provides effective protection against lightning strikes, in particular because electrically conductive elements are used that are suitable for rapidly discharging a large quantity of electricity in the event of a lightning strike and also for locally amplifying the electromagnetic field in such a manner as to encourage the appearance of an electric arc on the protector device, thereby protecting the underlying structure.

Furthermore, because of the presence of the thermally insulating protective coating, the integrity of the protector device of the invention is preserved even when it is used on structures that are exposed to large heat fluxes. Since the protective coating is also electrically conductive, it contributes to the overall electrical efficiency of the device by providing electrical continuity between the electrically conductive elements and the conductive paint.

Furthermore, the design of the device is suitable for adapting to shapes of any type, even shapes that are complex.

In a first aspect of the device of the invention, the electrically conductive elements comprise metal strips, each including at least one edge projecting beyond the protective coating. The presence of at least one edge exposed outside the coating makes it possible to create a point effect and to encourage electric arc creation on the elements of the protective device rather than on the structure that is to be protected. For this purpose, the metal strips may, in particular, present a section that is triangular, rectangular, or square.

In a second aspect of the device of the invention, at least some of the electrically conductive elements are interconnected so as to increase the capacity of the lightning protector device to discharge electric current. The electrically conductive elements may be connected together by electrical conductors of any type such as wires, metal braids, or a conductive coating.

The invention also provides a structure that is sensitive to lightning and that is to operate in high temperature environments, said structure being characterized in that at least a portion thereof is provided with a lightning protector device of the invention. The structure corresponds in particular to a nozzle, an after-body, or a shroud of a thruster.

The invention also provides a method of making a lightning protector device on a structure that is to be protected, said method comprising at least:

depositing a surface coating on the structure that is to be protected, the coating comprising at least one conductive paint layer;

fastening a plurality of spaced-apart electrically conductive elements on the conductive paint layer of the surface coating or directly on the structure before said surface coating is formed; and depositing a protective coating on the surface coating, the protective coating comprising a material that is thermally insulating and electrically conductive, the protective coating covering the electrically conductive elements in part.

In a first aspect of the method of the invention, the method includes fastening the metal strips directly on the structure or on the conductive paint layer e.g. by adhesive or by mechanical fastening, so as to form the electrically conductive elements, each metal strip including at least one edge projecting beyond the protective coating.

In a second aspect of the method of the invention, the metal strip presents a section that is triangular, rectangular, or square.

In a third aspect of the invention, the method further comprises connecting together at least some of the electrically conductive elements.

BRIEF DESCRIPTION OF THE DRAWINGS

Other characteristics and advantages of the invention appear from the following description of particular embodiments of the invention given as non-limiting examples, with reference to the accompanying drawings, in which.

DETAILED DESCRIPTION OF EMBODIMENTS

The lightning protector device of the invention is preferably, but not exclusively, for use on any structure made of material that does not conduct electricity or that is covered in an electrically-insulating material or layer on its surface (s) for protecting, as applies for example to the thermal protection coating used on launchers, the structure also being for use in high temperature environments.

A method of fabricating a lightning protector device in an implementation of the invention is described with reference to FIGS. 1 and 2A to 2F.

Figure 1:
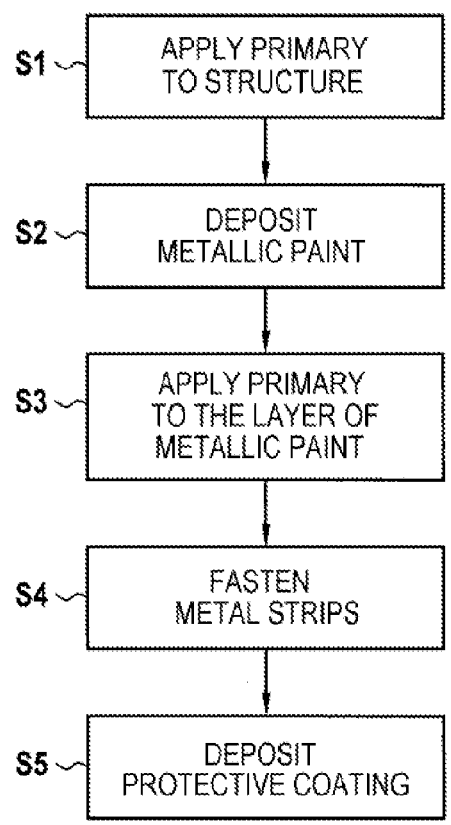
FIG. 1 is a flow chart of the steps of a method of fabricating a lightning protector device of the invention as shown in FIGS. 2A to 2F.
Figures 2A, 2B:
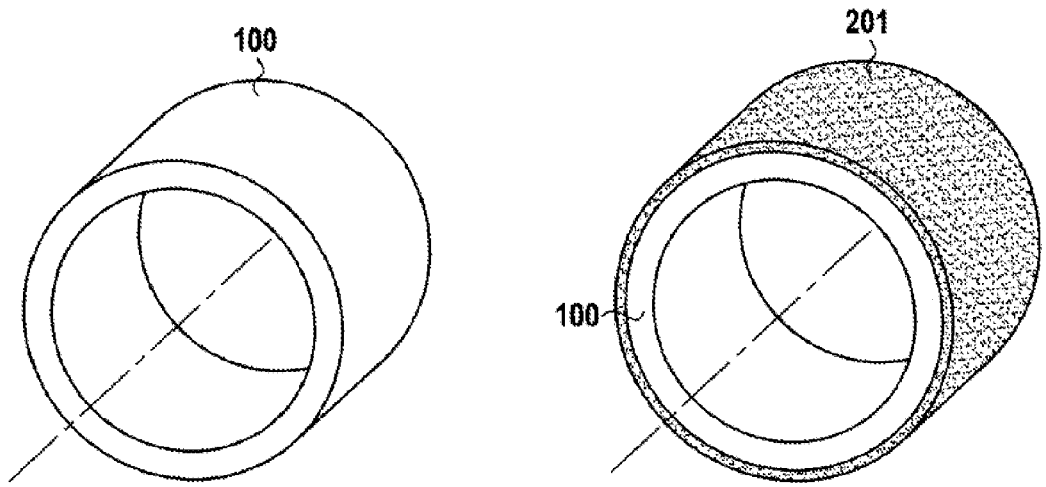
FIGS. 2A to 2F are diagrammatic views of the method of fabricating a lightning protector device in an implementation of the invention.

FIG. 2A shows an axisymmetric part 100 corresponding to a structure that is to be protected against lightning. The part 100 may be made of a thermostructural composite material that does not conduct electricity, e.g. corresponding to a subassembly of a rocket engine or an aeroengine that is exposed to the high temperatures generated by hot gas coming from the engine.

By way of example, the part 100 is made of a silicon carbide/silicon carbide (SiC/SiC) composite material that, in known manner, is a material constituted by reinforcement of SiC fibers and densified by an SiC matrix. Thermostructural composite materials, such as the SiC/SiC material, are characterized by their high-grade mechanical properties, which make them suitable for constituting structural parts, and by their capacity for conserving these mechanical properties at high temperatures.

The part 100 having an outside surface that is made of a material that does not conduct electricity might be struck by lightning. In the event of the part or the assembly in which the part is incorporated being struck by lightning, the electric arc formed in that way can cause the part to be damaged or destroyed (with effects that may be direct or indirect). The same applies to the dielectric coating present on the surfaces of structures that are to be protected.

For this purpose, and in accordance with an implementation of the invention, a lightning protector device suitable for withstanding high temperatures is formed on the outside surface of the part 100, corresponding in this example to the portion of the part 100 that is to be protected against lightning.

Figure 2C:
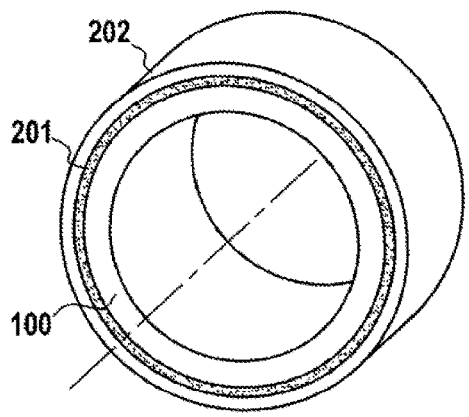
Figure 2D:
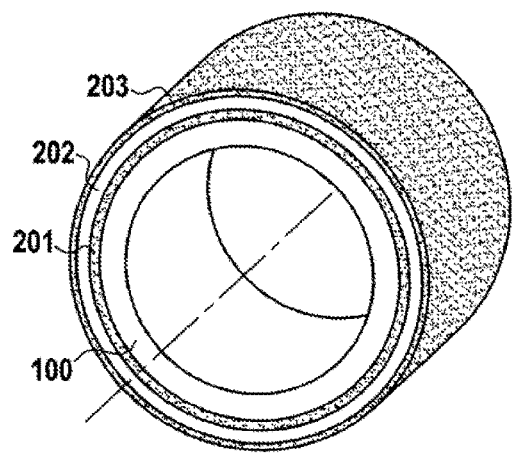

Preparation of the protector device begins by depositing an electrically-conductive or metallic paint layer 202 on the outside surface of the part 100 that is to be protected (step S2, FIG. 2C). In the presently-described example, a primary layer 201, e.g. an epoxy primary, is deposited beforehand on the surface of the part 100 in order to enhance the adhesion of the conductive paint (step S1, FIG. 2B). Nevertheless, when the part that is to be protected presents a surface state that is compatible with a metal paint adhering thereto, prior deposition of a primary is unnecessary and the metallic paint may be deposited directly on the surface of the part.

The conductive paint, and the primary, if any, may be deposited by air spraying or by manual deposition. The conductive paint may be constituted by an acrylic resin incorporating pigments that are based on particles of metal, such as for example particles of silver, aluminum, copper, etc. The paint may optionally be diluted in a solvent prior to application. In addition, a plurality of layers of conductive paint may be deposited consecutively in order to obtain a desired thickness for the layer, and consequently obtain the intended value of surface conductivity.

Figure 2E:
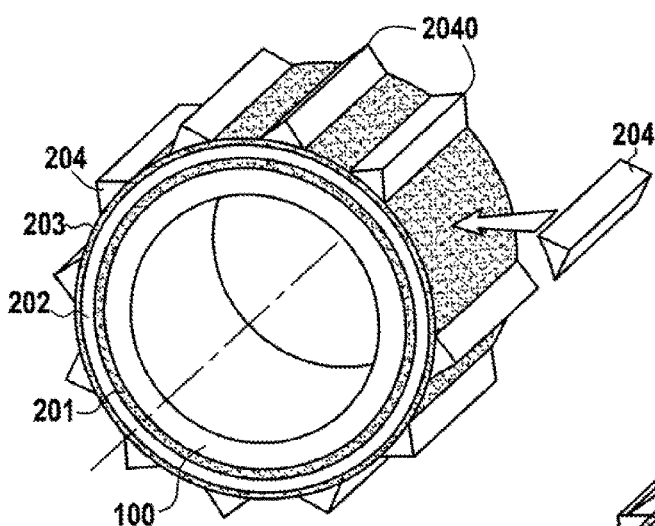

Preparation of the protector device continues with laying electrically conductive elements on the metallic paint (step S4, FIG. 2E). In the presently-described example, the electrically conductive elements are constituted by metal strips 204, e.g. made of aluminum or copper, presenting a section that is triangular forming an outwardly-directed edge 2040.

In the presently-described example, the metal strips 204 are bonded on the layer of metallic paint 202 with a thermally conductive adhesive such as, for example, a single-component silicone elastomer. For this purpose, a layer of a primary 203, e.g. an epoxy primary filled with electrically conductive particles is previously deposited on the layer of metallic paint 202 in order to enhance the adhesion of the metal strips 204 (step S3, FIG. 2D).

In order to create a point effect for better attracting lightning, each of the electrically conductive elements used in the lightning protector device preferably includes at least one edge facing towards the outside of the device when said elements are fastened on the metallic paint. Thus, the strips may be of a section other than a triangular section. By way of example, the electrically conductive elements may equally well be constituted by metal strips presenting a section that is square or triangular.

In the presently-described implementation, the metal strips 204 are bonded to the metallic paint layer 202 via the primary layer 203. Nevertheless, it is also possible to use mechanical fastener means for holding the metal strips. In particular, it is possible to use clamping collars previously bonded to the primary layer, or any other mechanical system for fastening the metal strips.

An electric current present in a metal strip can be transmitted at least in part to the other metal strips via the conductive paint layer, thereby making it easier to discharge electricity accumulated in one or more metal strips. Depending on requirements, the capacity of the protector device for discharging electricity may be further increased by directly connecting some or all of the metal strips together by using conductor elements such as metal braids or wires.

Figure 2F:
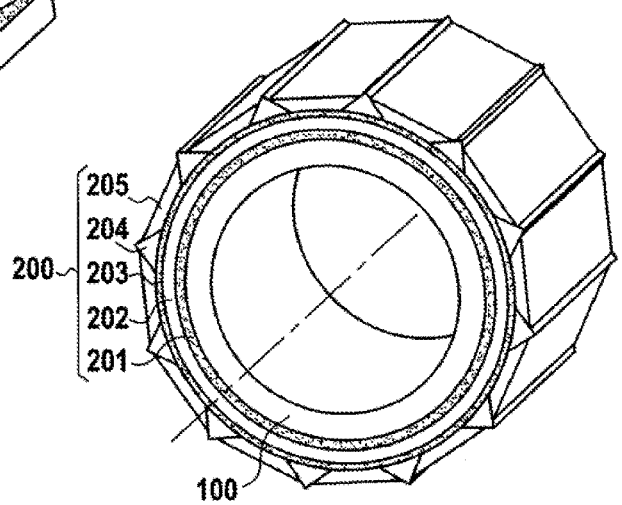
Figure 3:
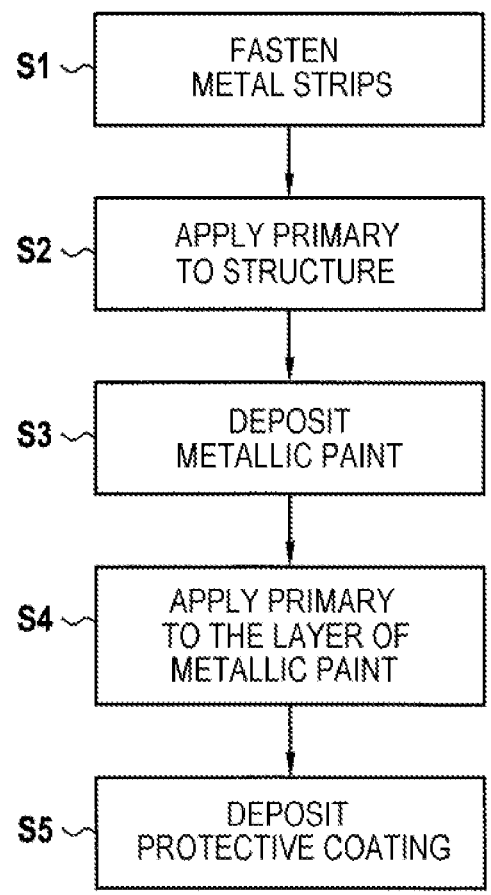
FIG. 3 is a flow chart of the steps of the method of fabricating a lightning protector device of the invention as shown in FIGS. 4A to 4E.

Once the metal strips 204 have been fastened on the primary layer 203, a protective coating 205 is deposited both over the surface coating present between the metal strips, the primary layer 203 in this example, and in part on the metal strips 204 (step S5, FIG. 2F). The thickness of the deposited protective coating is less than the height of the metal strips 204 so that the edge 2040 of each strip is not covered by the protecting coating 205 and can perform in its point effect function in full.

The protective coating 205 is both thermally insulating in order to protect the metal paint from surrounding heat fluxes, and also electrically conductive in order to enhance electrical conduction between the metal strips and the metallic paint. The protective coating 205 preferably presents thermal conductivity of less than 0.1 watts per meter per kelvin (W·m$^{-1}$·K$^{-1}$) and surface resistivity of less than 200 ohms per square. The protective coating 205 may be constituted by silicone resin filled with electrically conductive particles such as particles of silver. The protective coating is deposited by spraying. It may be deposited as a plurality of successive layers in order to obtain the desired thickness, and consequently obtain the intended surface conductivity. The edges 2040 of the strips 204 may previously be covered with removable protection in order to prevent the protective coating being deposited thereon during spraying.

As shown in FIG. 2F, a protector device 200 is thus obtained on the surface 100a of the part 100, which protector device comprises:
- a surface coating that is constituted in this example by a first primary 201, a metallic paint layer 202, and a second primary 203;
- a plurality of metal strips 204 in contact with the metallic paint layer 202 via the second primary 203; and
- a protective coating 205 present between the metal strips and covering them in part.

FIGS. 3 and 4A to 4E describe another embodiment of a lightning protector device of the invention that differs from the above-described protector device 200 in that the metal strips are fastened directly to the surface of the surface that is to be protected and they are subsequently covered in metallic paint.

Figure 4A:
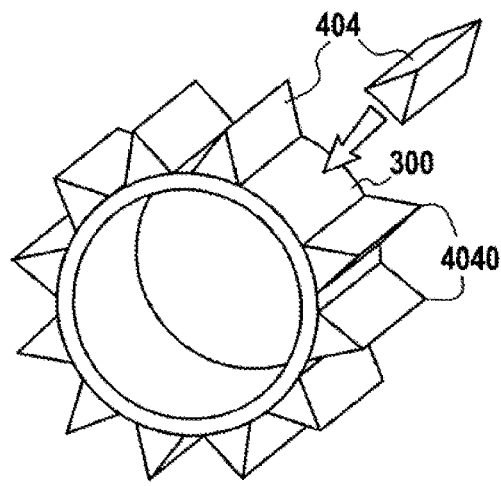
FIGS. 4A to 4E are diagrammatic views of a method of fabricating a lightning protector device in accordance with another implementation of the invention.
Figure 4B:
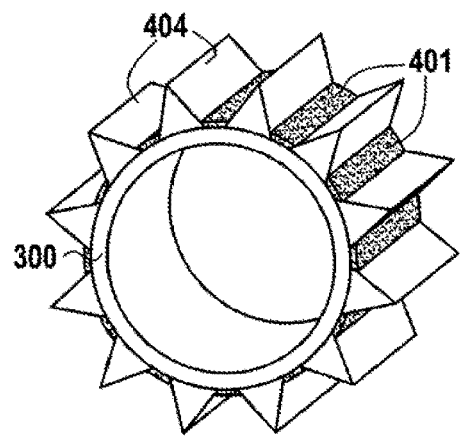

More precisely, preparation of the protector device begins by laying electrically conductive elements on the structure 300 to be protected against lightning, which elements are constituted in this example by metal strips 404 of triangular section, each forming an outwardly-directed edge 4040 (step S1, FIG. 4A). The metal strips 404 may be adhesively bonded on the structure 300 and/or they may be held with the help of mechanical means (collars, screws, etc.).

Figure 4C:
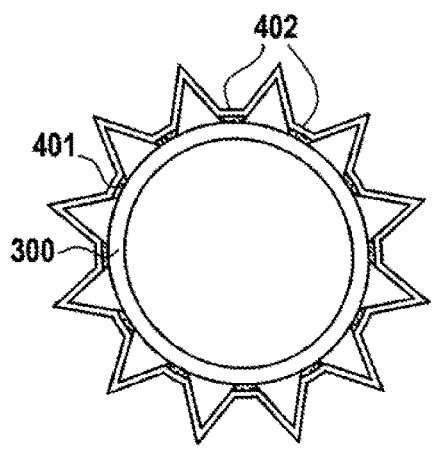
Figure 4D:
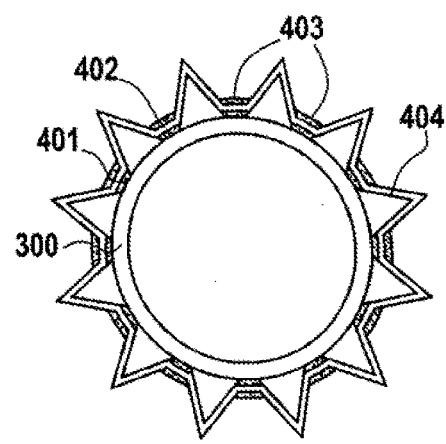

An electrically conductive or metallic paint layer 402 is deposited on the outside surface of the structure 300 that is to be protected (step S3, FIG. 4C). In the presently-described example, a layer of a primary 401, e.g. an epoxy primary, is previously deposited on the surface of the structure 300 in order to enhance adhesion of the conductive paint (step S2, FIG. 4B). Nevertheless, when the part that is to be protected presents a surface state that is compatible with bonding a metallic paint, prior deposition of a primary is unnecessary and the metallic paint may be deposited directly on the surface of the part.

In the presently-described example, the metallic paint layer 402 covers the metal strips 404. Nevertheless, the metal strips may be temporarily protected during deposition of the metallic paint layer in order to avoid covering the strips.

Figure 4E:
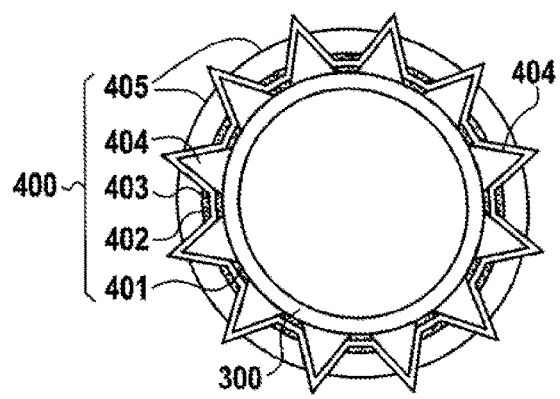

Preparation of the protector device continues with deposition of a protective coating 405, both on the surface coating present between the metal strips, in this example the primary layer 401, and also on the metal strips 404 in part (step S5, FIG. 4E). The thickness of the deposited protective coating is less than the height of the metal strips 404 so that the edge of each strip projects from the protective coating 405 and performs its point effect role in full. In the presently-described example, a primary layer 403 is previously deposited on the metallic paint present between the strips 404 (step S4, FIG. 4D).

The protective coating 405 is both thermally insulating in order to protect the metallic paint from surrounding heat fluxes and also electrically conductive in order to enhance electrical conduction between the metal strips and the metallic paint. The protective coating 205 preferably presents thermal conductivity of less than 0.1 W·m$^{-1}$·K$^{-1}$ and surface resistivity of less than 200 ohms per square. The protective coating may be constituted by a silicone resin filled with electrically conductive particles such as particles of silver. The protective coating is deposited by spraying. It may be deposited as a plurality of successive layers in order to obtain the desired thickness, and consequently the intended surface conductivity. The edges 4040 of the strips 404 may previously be covered in removable protection in order to prevent the protective coating being deposited thereon during spraying.

As shown in FIG. 4E, a protector device 400 is then obtained at the surface of the part 300, the device comprising:
- a plurality of metal strips 404 in contact with the structure 300;
- a surface coating constituted in this example by a first primary 401, a metallic paint layer 402, and a second primary 403; and
- a protective coating 405 that is present between the metal strips and that covers them in part.

The invention claimed is:

1. A lightning protector device for laying on a structure that is to be protected, said device comprising:
    a surface coating comprising at least one conductive paint layer;
    a plurality of electrically conductive elements arranged in spaced-apart manner on the structure, said elements being in contact with the conductive paint layer; and
    a protective coating arranged on the surface coating and comprising a material that is thermally insulating and electrically conductive, the protective coating covering the electrically conductive elements in part.

2. A device according to claim 1, wherein the electrically conductive elements comprise metal strips each including at least one edge projecting beyond the protective coating.

3. A device according to claim 2, wherein the metal strips present a section that is triangular.

4. A device according to claim 1, wherein at least some of the electrically conductive elements are interconnected.

5. A structure that is sensitive to lightning and that is to operate in high temperature environments, wherein at least a portion thereof is provided with a lightning protector device according to claim 1.

6. A structure according to claim 5, constituting at least one of the following elements of a thruster: a nozzle; an after-body; and a shroud.

7. A method of making a lightning protector device on a structure that is to be protected, said method comprising at least:
    depositing a surface coating on the structure that is to be protected, the coating comprising at least one conductive paint layer;
    fastening a plurality of spaced-apart electrically conductive elements on the conductive paint layer of the surface coating; and
    depositing a protective coating on the surface coating, the protective coating comprising a material that is thermally insulating and electrically conductive, the protective coating covering the electrically conductive elements in part.

8. A method of making a lightning protector device on a structure that is to be protected, said method comprising at least:

fastening a plurality of spaced-apart electrically conductive elements on the structure;

depositing a surface coating on the structure that is to be protected, the coating comprising at least one conductive paint layer; and depositing a protective coating on the surface coating, the protective coating comprising a material that is thermally insulating and electrically conductive, the protective coating covering the electrically conductive elements in part.

9. A method according to claim 7, including fastening metal strips on the conductive paint layer so as to form said electrically conductive elements, each metal strip including at least one edge extending above the protective coating.

10. A method according to claim 8, including fastening metal strips on the structure so as to form said electrically conductive elements, each metal strip including at least one edge extending above the protective coating.

11. A method according to claim 9, wherein each metal strip presents a section that is triangular.

12. A method according to claim 10, wherein each metal strip presents a section that is triangular.

13. A method according to claim 7, further including connecting together at least some of the electrically conductive elements.

14. A method according to claim 8, further including connecting together at least some of the electrically conductive elements.

* * * * *